US011686609B2

(12) United States Patent
Dowling et al.

(10) Patent No.: US 11,686,609 B2
(45) Date of Patent: Jun. 27, 2023

(54) SYSTEM AND METHOD FOR DETECTING DISTRIBUTION OF WEIGHT OF PAYLOAD IN DUMP BODIES

(71) Applicant: Caterpillar Underground Mining Pty. Ltd., South Burnie (AU)

(72) Inventors: Alexander Eli Dowling, South Burnie (AU); Brodie Lee Thompson, South Burnie (AU)

(73) Assignee: Caterpillar Underground Mining Pty. Ltd., Tasmania (AU)

( * ) Notice: Subject to any disclaimer, the term of this patent is extended or adjusted under 35 U.S.C. 154(b) by 297 days.

(21) Appl. No.: 17/062,858

(22) Filed: Oct. 5, 2020

(65) Prior Publication Data
US 2021/0123793 A1 Apr. 29, 2021

(30) Foreign Application Priority Data
Oct. 29, 2019 (AU) ................. 2019257403

(51) Int. Cl.
| | |
|---|---|
| G01G 19/08 | (2006.01) |
| G01G 19/12 | (2006.01) |
| B60P 1/28 | (2006.01) |
| B60W 40/13 | (2012.01) |

(52) U.S. Cl.
CPC ........... *G01G 19/086* (2013.01); *B60P 1/286* (2013.01); *G01G 19/12* (2013.01); *B60W 2040/1315* (2013.01)

(58) Field of Classification Search
CPC ....... G01G 19/086; G01G 19/12; B60P 1/286; B60P 1/283; B60W 2040/1315; B60W 40/13; G01M 1/122
See application file for complete search history.

(56) References Cited

U.S. PATENT DOCUMENTS

| | | | |
|---|---|---|---|
| 8,818,699 B2 | 8/2014 | Nichols et al. | |
| 2003/0173324 A1* | 9/2003 | Puszkiewicz | ........... B66C 23/90 212/277 |
| 2004/0226755 A1* | 11/2004 | Pottebaum | ............. G01G 19/12 177/25.13 |
| 2008/0208416 A1* | 8/2008 | Yuet | ...................... B60W 30/04 340/440 |

(Continued)

FOREIGN PATENT DOCUMENTS

| | | | | |
|---|---|---|---|---|
| GB | 2424961 A | * | 10/2006 | ............. B60P 1/045 |
| WO | WO 8901137 A1 | | 2/1989 | |

*Primary Examiner* — Manuel L Barbee

(74) *Attorney, Agent, or Firm* — von Briesen & Roper, s.c.

(57) ABSTRACT

A system for detecting distribution of a weight of a payload in a dump body of a vehicle includes first sensors, second sensors, and a controller. The dump body is pivotable about pins to be selectively seated and titled to a frame of the vehicle. The first sensors are arranged between the dump body and the frame, and detect components of the weight of the payload exerted through the dump body when the dump body is seated relative to the frame. The second sensors are arranged correspondingly within the pins, and detect components of the weight of the payload exerted through the dump body. The controller determines a status of payload distribution in the dump body based on the component of the weight of the payload detected by the first sensors and second sensors, and generate a notification to indicate the status of payload distribution.

18 Claims, 6 Drawing Sheets

(56) References Cited

U.S. PATENT DOCUMENTS

2010/0131182 A1    5/2010   Deegan
2011/0196623 A1*   8/2011   Hakkinen .......... G01G 23/3728
                                                                702/41

* cited by examiner

SYSTEM AND METHOD FOR DETECTING DISTRIBUTION OF WEIGHT OF PAYLOAD IN DUMP BODIES

CROSS-REFERENCE TO RELATED APPLICATION

This application claims priority under 35 USC § 119 and the Paris Convention to Australian Patent Application No. 2019257403 filed on Oct. 29, 2019.

TECHNICAL FIELD

The present disclosure relates to machines or vehicles having dump bodies that are adapted to receive a payload therein. More particularly, the present disclosure relates to a system and a method for detecting a distribution of a weight of a payload in dump bodies.

BACKGROUND

Machines, such as mining trucks, articulated trucks, etc., generally include a dump body into which a variety of materials, such as rocks, ores, soil, dirt, debris, disintegrated particles, minerals, etc., are received as a payload. Once the payload is received into the dump body, the payload is transferred by the machine to a site, such as a dump site, where the payload is dumped and/or unloaded from the dump body. During the receipt of the payload into the dump body and/or during the transfer of the payload to the site, the payload may acquire an improper or inappropriate seating and/or location within the dump body. Such improper seating and/or location of the payload within the dump body may hamper the machine's operation. For example, an improperly seated and/or located payload may cause the machine to become unstable during the receipt or the transfer of the payload.

U.S. Pat. No. 8,818,699 relates to a stability detection system for detecting the stability of an articulated vehicle. The stability detection system includes a weigh system having weight sensors coupled to corresponding rear and front wheel assemblies of the articulated vehicle. The weight sensors measure the load of articulated vehicle on each of wheel assemblies and facilitate the calculation of the center of gravity and monitor a risk of rollover of the articulated vehicle.

Reference to any prior art in the specification is not an acknowledgement or suggestion that this prior art forms part of the common general knowledge in any jurisdiction or that this prior art could reasonably be expected to be combined with any other piece of prior art by a skilled person in the art.

By way of clarification and for avoidance of doubt, as used herein and except where the context requires otherwise, the term "comprise" and variations of the term, such as "comprising", "comprises" and "comprised", are not intended to exclude further additions, components, integers or steps.

SUMMARY OF THE INVENTION

In one aspect, the disclosure is directed towards a system for detecting distribution of a weight of a payload in a dump body of a vehicle. The dump body is pivotable about co-axially aligned pins to be selectively seated and titled relative to a frame of the vehicle. The system includes multiple first sensors, multiple second sensors, and a controller. The first sensors are adapted to be arranged between the dump body and the frame. Each first sensor is configured to detect a component of the weight of the payload exerted through the dump body when the dump body is seated relative to the frame. The second sensors are adapted to be arranged correspondingly within the co-axially aligned pins. Each second sensor is configured to detect a component of the weight of the payload exerted through the dump body. The controller is configured to determine a status of payload distribution in the dump body based on the component of the weight of the payload detected by each first sensor and each second sensor, and generate a notification to indicate the status of payload distribution.

In another aspect, the disclosure is related to a machine including a frame, a dump body being pivotable about a plurality of co-axially aligned pins to be selectively seated and titled relative to the frame and being adapted to receive a payload, and a system for detecting distribution of a weight of the payload. The system includes multiple first sensors, multiple second sensors, and a controller. The first sensors are adapted to be arranged between the dump body and the frame. Each first sensor is configured to detect a component of the weight of the payload exerted through the dump body when the dump body is seated relative to the frame. The second sensors are adapted to be arranged correspondingly within the co-axially aligned pins. Each second sensor is configured to detect a component of the weight of the payload exerted through the dump body. The controller is configured to determine a status of payload distribution in the dump body based on the component of the weight of the payload detected by each first sensor and each second sensor, and generate a notification to indicate the status of payload distribution.

In yet another aspect, the disclosure is directed towards a method for detecting distribution of a weight of a payload in a dump body of a vehicle. The dump body is pivotable about co-axially aligned pins to be selectively seated and titled relative to a frame of the vehicle. The method includes detecting, by first sensors, components of the weight of the payload exerted through the dump body correspondingly when the dump body is seated relative to the frame. The first sensors are arranged between the dump body and the frame. Further, the method includes detecting, by second sensors, components of the weight of the payload exerted through the dump body correspondingly. The second sensors are arranged correspondingly within the co-axially aligned pins. The method also includes determining, by a controller, a status of payload distribution in the dump body based on components of the weight of the payload detected correspondingly by the first sensors and the second sensors; and generating, by the controller, a notification to indicate the status of payload distribution.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
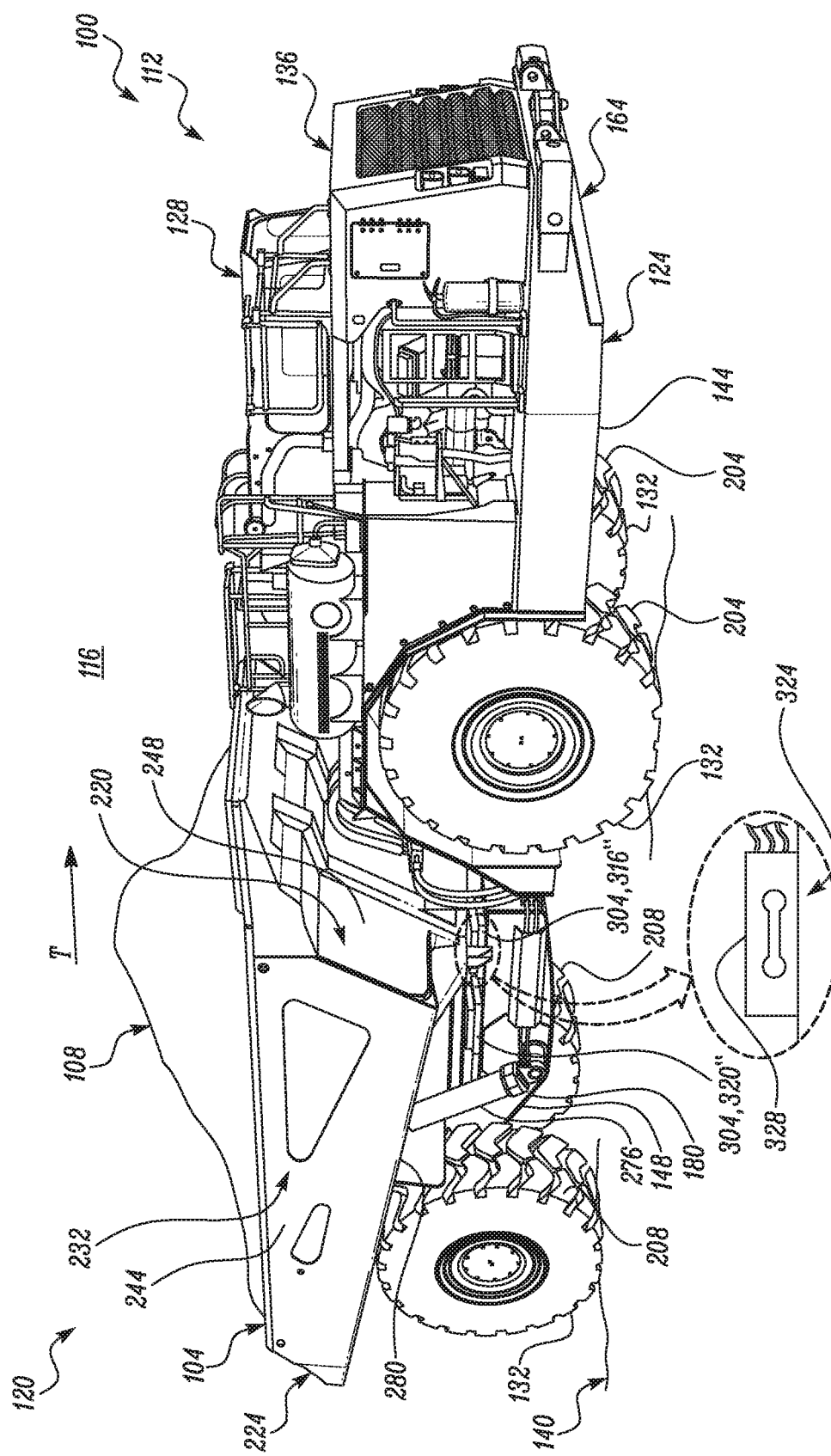
FIG. 1 is an exemplary vehicle having a dump body operating at a worksite, in accordance with an embodiment of the present disclosure.
Figure 2:
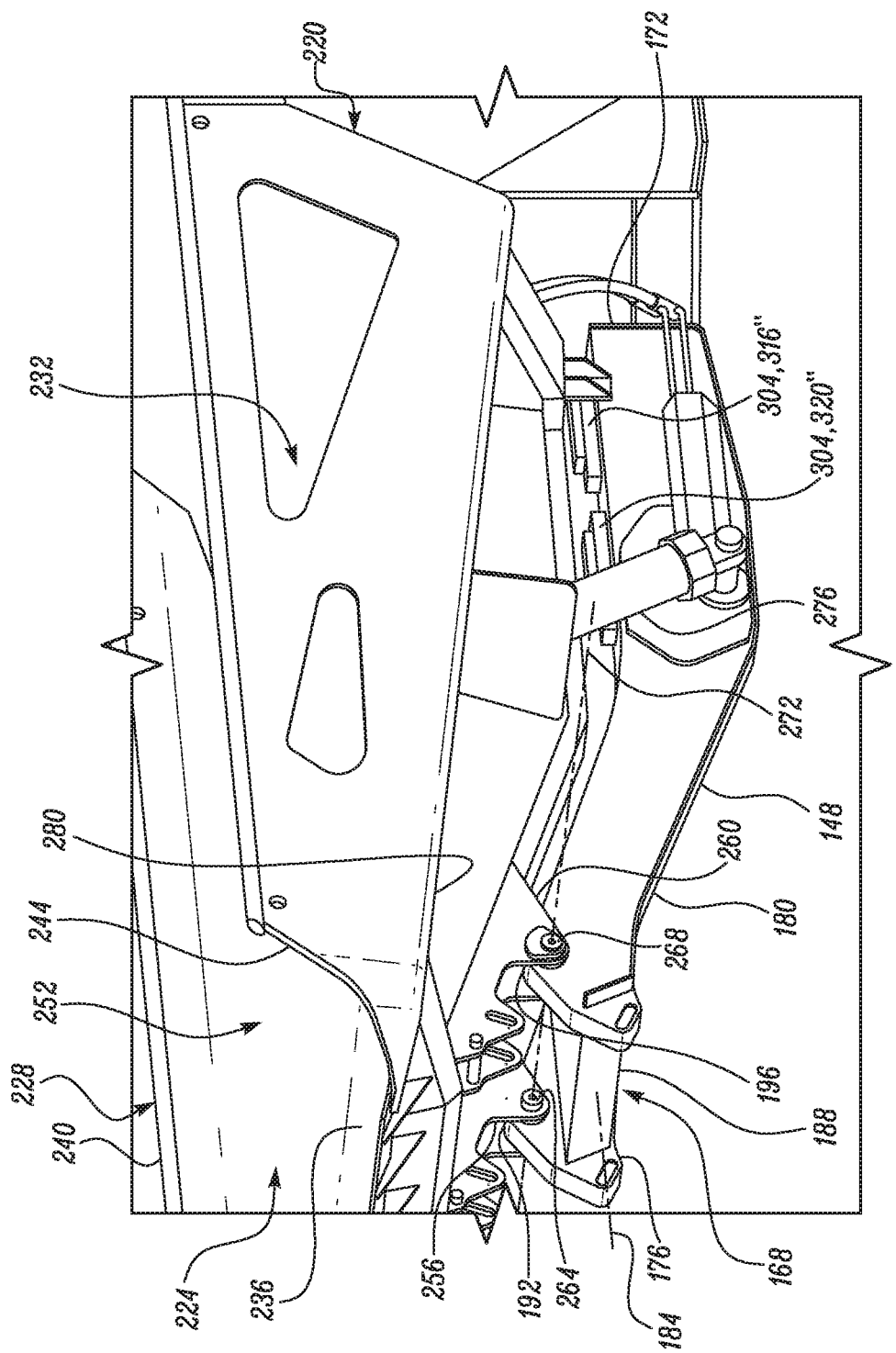
FIG. 2 is a close-up of a rearward sub-frame portion of a frame of the vehicle, in accordance with an embodiment of the present disclosure.

Referring to FIGS. 1 and 2, an exemplary vehicle 100 is shown. The vehicle 100 may be one having a dump body 104 within which a payload 108 may be carried for transferring the payload 108 from one location to another. According to one aspect of the present disclosure, the vehicle 100 includes or is representative of a mobile machine or a construction machine having the dump body 104—and shall be hereinafter referred to as a machine 112. The machine 112 may be operable at a worksite 116, and may repeatedly traverse back and forth relative to various locations on the worksite 116. Such locations may include load locations from where the machine 112 (i.e., the dump body 104 of the machine 112) may receive the payload 108, and dump locations up to where the machine 112 may traverse to so as to release and dump the received payload 108 from the dump body 104. Examples of the worksite 116 may include a construction site, a mine site, a landfill, a quarry, an underground mine site, etc.

In one exemplary embodiment of the present disclosure, the machine 112 includes a dump truck, such as an articulated dump truck 120, which is commonly employed and operated at mine sites for the transfer of materials, such as ores and minerals. However, aspects of the present disclosure may be applied to several machines or vehicles having dump bodies. For example, aspects of the present disclosure also may be applicable to mining trucks, off-highway trucks, pick-up trucks, and similar machines. The machine 112 includes a frame 124, an operator cab 128, one or more traction devices 132. The machine 112 may also include several other parts and sub-systems, such as a power compartment 136 that may house a power source (e.g., an internal combustion engine) for powering various functions of the machine 112, including propelling the machine 112 over a ground surface 140 of the worksite 116.

Referring to FIGS. 1 to 4, the frame 124 may include a rigid structure to which nearly every other component (and/or sub-component) of the machine 112 may be coupled to. If the machine 112 were to include an articulated machine, such as the articulated dump truck 120, as exemplarily shown, it may be contemplated that the frame 124 may include a forward sub-frame portion 144 and a rearward sub-frame portion 148. The forward sub-frame portion 144 may be pivotably coupled to the rearward sub-frame portion 148 by a hitch 152 at a hitch location 156 (as visualized in FIG. 3). By way of the hitch 152, the forward sub-frame portion 144 may pivot or articulate relative to the rearward sub-frame portion 148 of the frame 124, during machine movement.

For example, the forward sub-frame portion 144 may support the operator cab 128 that, apart from housing various parts and systems, such as controls, etc., of the machine 112, may be also applied to accommodate/station one or more operators (not shown) of the machine 112 for the control of the many functions of the machine 112. The operator cab 128 may include an operator interface 160 (see FIG. 6), including one or more of a display unit, a speaker unit, a control panel, a touchscreen, and/or the like, that may be accessed by one or more operators of the machine 112 so as to feed certain input related to a functioning of the machine 112. Optionally, the operator interface 160 may be situated remote to the machine 112. Apart from the operator cab 128, the forward sub-frame portion 144 may also support the power compartment 136 housing the power source (e.g., the internal combustion engine). Additionally, the forward sub-frame portion 144 may define a forward end 164 of the machine 112.

The rearward sub-frame portion 148 may support the dump body 104 of the machine 112. For example, the rearward sub-frame portion 148 may define a rearward end 168 of the machine 112. The rearward sub-frame portion 148 may also define a cab facing end 172, opposite to the rearward end 168, at which end the rearward sub-frame portion 148 may be pivotably coupled to the forward sub-frame portion 144 by way of the hitch 152. Although not limited, the rearward sub-frame portion 148 includes a configuration similar to that of a ladder frame layout. For example, the rearward sub-frame portion 148 may include a first arm 176 and a second arm 180.

Figure 3:
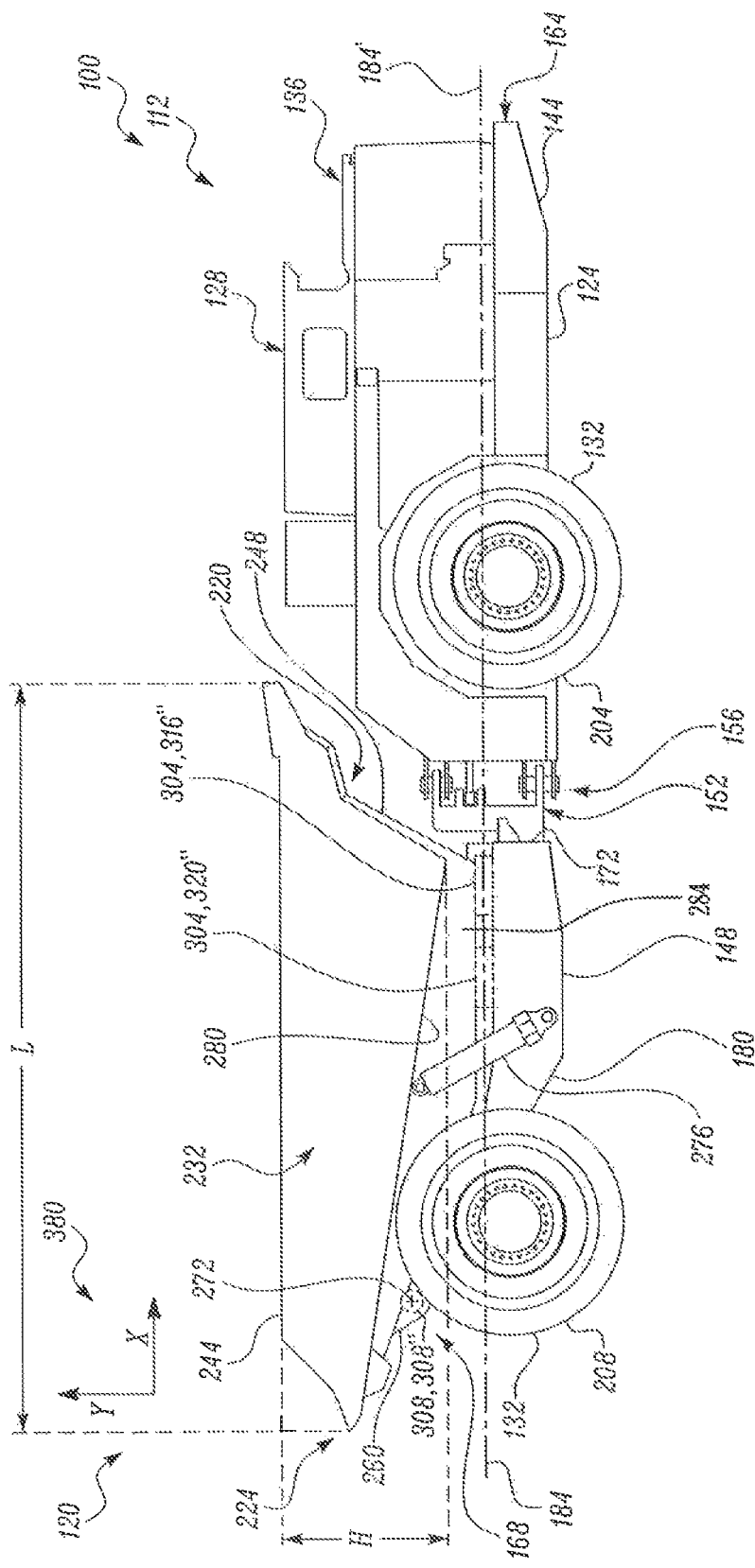
FIG. 3 is a side view of a model of the vehicle, in accordance with an embodiment of the present disclosure.

The first arm 176 is hidden behind the second arm 180 in the orientation of the machine 112, as visualized in FIG. 3, and cannot be explicitly viewed in FIG. 1. However, the first arm 176 may be visualized by reference to FIGS. 2 and 4. In further detail, the first arm 176 may be structurally similar to the second arm 180 and may be parallelly disposed with respect to the second arm 180. For example, the rearward sub-frame portion 148 of the frame 124 may define a rearward longitudinal axis 184 extending along a length of the rearward sub-frame portion 148, and both the first arm 176 and the second arm 180 may be symmetrically laid out to each other about the rearward longitudinal axis 184 (see FIGS. 2 and 3). Further, both the first arm 176 and the second arm 180 may extend along the rearward longitudinal axis 184 of the rearward sub-frame portion 148 of the frame 124. The rearward sub-frame portion 148 may also include a set of links (e.g., see one link 188, FIG. 2) extending between the first arm 176 and the second arm 180 and fixedly connected (e.g., by welding) to each of the first arm 176 and the second arm 180. In that manner, the set of links may enable the first arm 176 and the second arm 180 to be rigidly and immovably coupled to each other.

Further, the rearward end 168 of the rearward sub-frame portion 148 of the frame 124 may include a set of engagement structures, e.g., a pair of engagement structures, explicitly referred to as a first engagement structure 192 and a second engagement structure 196. The first engagement structure 192 may be arranged on the first arm 176 at the rearward end 168, while the second engagement structure 196 may be arranged on the second arm 180 at the rearward end 168. In some embodiments, the first engagement structure 192 and the second engagement structure 196 each include a through-hole—see an exemplary through-hole 200 illustrated by way of a cross-sectional view of the first engagement structure 192 of the first arm 176 in FIG. 5. Although not illustrated, a similar through-hole may be provided in the second engagement structure 196 of the second arm 180.

It may be noted that the terms 'forward' and 'rearward', as used herein, are in relation to an exemplary direction of travel of the machine 112, as represented by arrow, T, in FIG. 1. Said direction of travel is exemplarily defined from the rearward end 168 towards the forward end 164. Like the rearward longitudinal axis 184 of the rearward sub-frame portion 148, the forward sub-frame portion 144 may define a similar, forward longitudinal axis 184' (see FIG. 3) defined along a length of the forward sub-frame portion 144 of the machine 112. During a straight travel of the machine 112, the rearward longitudinal axis 184 may be aligned (i.e., to fall in line) with the forward longitudinal axis 184', and accordingly may define a common longitudinal axis of the machine 112. However, during a movement of the machine 112 either towards a left of the machine 112 or a right of the machine 112, the forward sub-frame portion 144 may articulate relative to the rearward sub-frame portion 148. In such cases, the forward longitudinal axis 184' may be tilted with respect to the rearward longitudinal axis 184 so as to make an angle with respect to the rearward longitudinal axis 184. Also, the terms 'left' and 'right' as used in the disclosure may be understood when viewing the machine 112 from the rearward end 168 towards the forward end 164 (also see exemplary orientation of the machine 112 in FIG. 4, with the depiction of a left arrow, DL, and a right arrow, DR).

The traction devices 132 may be operably coupled to the frame 124 and may movably support the frame 124 (i.e., the forward sub-frame portion 144 and the rearward sub-frame portion 148) above the ground surface 140, and may facilitate the movement of the machine 112 over the ground surface 140. For example, the traction devices 132 may be configured to receive power from the power source for propelling the frame 124 (and thus the machine 112) over the ground surface 140, thereby facilitating the machine's travel or movement along direction, T, through and across the expanse of the worksite 116. The traction devices 132 may include wheels, although other types of traction devices, such as endless tracks or crawler tracks, may be contemplated for employment either alone or in combination with the wheels. The traction devices may include a pair of forward wheels 204 (operably coupled to the forward sub-frame portion 144) and a pair of rearward wheels 208 (operably coupled to the rearward sub-frame portion 148), as shown.

The dump body 104 may define a front end 220, a rear end 224, and laterally opposed sides extending between the front end 220 and the rear end 224. The laterally opposed sides are defined as a left side 228 and a right side 232 of the dump body 104. The dump body 104 may be supported on the rearward sub-frame portion 148 of the frame 124 such that the front end 220 may be disposed against or be directed towards the forward sub-frame portion 144 of the machine 112. In further detail, the dump body 104 may include a floor 236 and a number of support walls extending (e.g., generally) upwardly from the floor 236. For example, the floor 236 may be spread out and extend all the way up to each of the front end 220, the rear end 224, the left side 228, and the right side 232, of the dump body 104. The support walls may include a left side support wall 240 extending from the floor 236 at the left side 228 of the dump body 104, a right side support wall 244 extending from the floor 236 at the right side 232 of the dump body 104, and a front end support wall 248 extending from the floor 236 at the front end 220 of the dump body 104. The front end support wall 248 may extend (e.g., without interruption) between the right side support wall 244 and the left side support wall 240, thereby connecting the right side support wall 244 to the left side support wall 240. Combinedly, the right side support wall 244, the left side support wall 240, the front end support wall 248, and the floor 236, may define a cavity 252 (see FIG. 2) of the dump body 104.

In one example, the dump body 104 may include a pair of brackets (e.g., a first bracket 256 and a second bracket 260).

The pair of brackets may be pivotably coupled to the pair of engagement structures. For example, the first bracket 256 may be pivotably coupled to the first engagement structure 192 and the second bracket 260 may be pivotably coupled to the second engagement structure 196. Further, a first pin 264 may be passed through both the first engagement structure 192 (e.g., through the through-hole 200 of the first engagement structure 192) and the first bracket 256 to enable the pivotable coupling therebetween, and, similarly, a second pin 268 may be passed through both the second engagement structure 196 (e.g., through a similar through-hole of the second engagement structure 196) and the second bracket 260 to enable the pivotable coupling therebetween. In so doing, the dump body 104 may be pivotably coupled to the frame 124 (i.e., to the rearward sub-frame portion 148 of the frame 124).

According to one embodiment of the present disclosure, the first pin 264 and the second pin 268 are co-axially aligned (i.e., disposed along a common axis 272) (see FIG. 2) to each other. The pivotable coupling, as established, allows the dump body 104 to be selectively 'seated' and 'tilted' relative to the rearward sub-frame portion 148 of the frame 124. It may be noted that during a movement of the machine 112, the dump body 104 may acquire a position in which the dump body 104 is seated on the rearward sub-frame portion 148 of the frame 124, while when the machine 112 releases and dumps the payload 108 at a dump location, the dump body 104 may acquire a position in which the dump body 104 is tilted relative to the rearward sub-frame portion 148 of the frame 124.

In one example, when the dump body 104 is tilted, the front end 220 may face upwards, away from the ground surface 140 and the rear end 224 may face downwards, towards the ground surface 140, and when the dump body 104 is seated, the dump body 104 may be resting atop and/or against the frame 124 (e.g., the first arm 176 and second arm 180 of the rearward sub-frame portion 148 of the frame). To effectuate a tilt of the dump body 104, one or more actuators (e.g., actuator 276) (coupled between the rearward sub-frame portion 148 and the dump body 104) may extend (e.g., by pushing) the front end 220 angularly upwards, allowing the rear end 224 to pivot with respect to the pair of engagement structures, in turn moving and causing the dump body 104 to gradually and eventually acquire a position in which the dump body 104 is tilted relative to the rearward sub-frame portion 148 of the frame 124. To effectuate a seating of the dump body 104, the actuators (e.g., actuator 276) may retract (e.g., by pulling) the front end 220 angularly downwards, allowing the rear end 224 to pivot (e.g., in a reverse direction) with respect to the pair of engagement structures, in turn moving and causing the dump body 104 to gradually and eventually acquire a position in which the dump body 104 is seated relative to the rearward sub-frame portion 148 of the frame 124.

Although not limited, no support wall may be present at the rear end 224 of the dump body 104, thus leaving the rear end 224 open to allow a release of the payload 108 through the rear end 224 (e.g., under the action of gravity) when the dump body 104 is tilted relative to the rearward sub-frame portion 148 of the frame 124. Further, in some embodiments, it may be contemplated that the floor 236 may define a receding gradient from the rear end 224 towards the front end 220 of the dump body 104, such that when the dump body 104 is seated relative to the rearward sub-frame portion 148 of the frame 124, a depth of the cavity 252 attained at the front end 220 is larger than a depth of the cavity 252 attained at the rear end 224.

In some embodiments, an underside of the floor 236 may define an underbody 280 of the dump body 104. The underbody 280 may include a protruded portion 284 that rests atop and/or against the frame 124 (e.g., the first arm 176 and second arm 180 of the rearward sub-frame portion 148 of the frame 124) when the dump body 104 is seated relative to the rearward sub-frame portion 148 of the frame 124. As shown, the protruded portion 284 may extend from the rear end 224 to the front end 220 of the dump body 104, generally along a length, L, of the dump body 104 (see FIG. 3).

Figure 4:
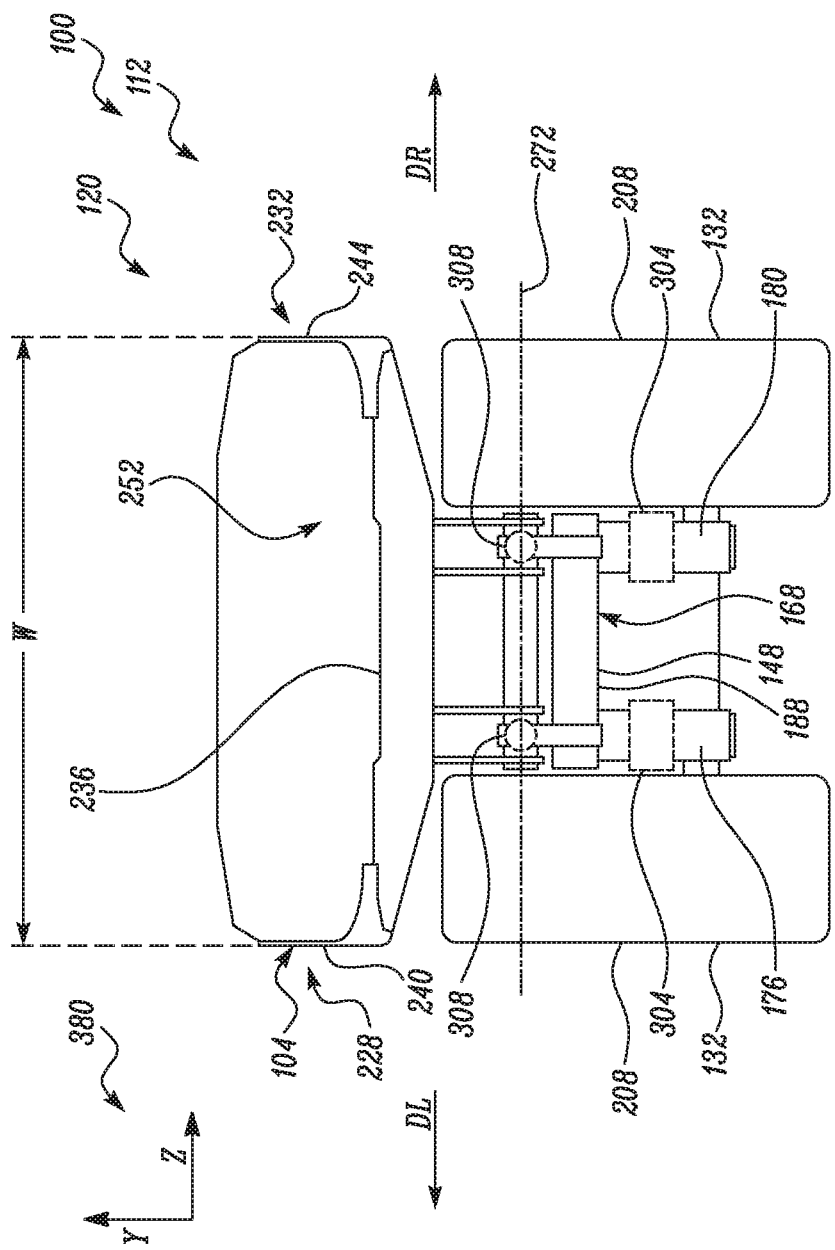
FIG. 4 is a rear view of the model of the vehicle, in accordance with an embodiment of the present disclosure.
Figure 6:
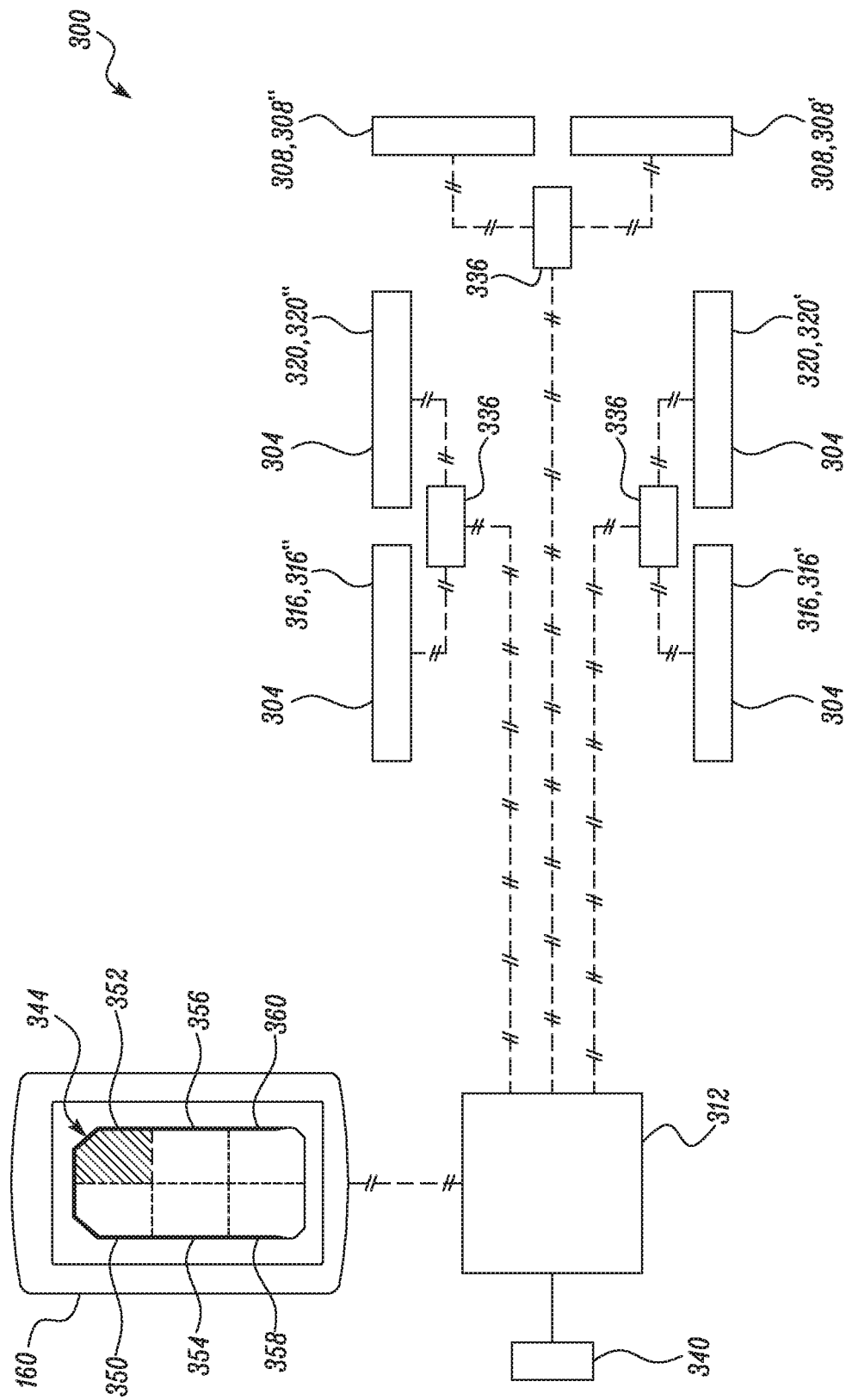
FIG. 6 is the schematic view of the system, in accordance with an embodiment of the present disclosure.

Referring to FIGS. 3, 4, and 6, one or more aspects of the present disclosure relate to a system 300 for detecting a distribution of a weight of the payload 108 in the dump body 104 (e.g., in the cavity 252 of the dump body 104). The system 300 includes a number of components—for example, the system 300 includes a plurality of first sensors 304, a plurality of second sensors 308, and a controller 312. It may be noted that the depictions of the machine 112 provided in FIGS. 3 and 4 may be digitally rendered images or models (e.g., obtainable on a display), for use by the controller 312 (see FIG. 6) for performing the many functions associated with the system 300 (e.g., the detection of distribution of a weight of the payload 108, as aforementioned). Nonetheless, annotations and reference numerals, as have been marked corresponding to various portions of the machine 112 in FIGS. 1 and 2, have also been marked and maintained in the depictions of the digitally generated images or models of the machine 112 in FIGS. 3 and 4, for easy co-relation and understanding.

The first sensors 304 may be configured to detect components of the weight of the payload 108 exerted through the dump body 104 correspondingly when the dump body 104 is seated relative to the frame 124 (i.e., the rearward sub-frame portion of the frame 124). For example, the first sensors 304 may be adapted to be arranged between the dump body 104 and the frame 124 (i.e., the rearward sub-frame portion 148 of the frame 124), and when the dump body 104 is seated relative to the frame 124, the protruded portion 284 may rest atop the first sensors 304 so as to exert force (i.e., weight of the payload 108) on the first sensors 304. In further detail, the first sensors 304 may include a primary sensor pair 316 and a secondary sensor pair 320. Details related to each of the primary sensor pair 316 and the secondary sensor pair 320 will now be discussed.

The primary sensor pair 316 is arranged in proximity of the front end 220 of the dump body 104. For example, the primary sensor pair 316 includes a first primary sensor 316' and a second primary sensor 316". The first primary sensor 316' may be coupled to the first arm 176, while the second primary sensor 316" may be coupled to the second arm 180. Both the first primary sensor 316' and the second primary sensor 316" may be arranged and coupled to corresponding portions of the first arm 176 and the second arm 180 where there is potential for the dump body 104 to touch or come into contact with the rearward sub-frame portion 148 of the frame 124. In general, the first primary sensor 316' and the second primary sensor 316" may be disposed along a width, W, of the dump body 104 and in proximity to the front end 220. In so doing, the first primary sensor 316' is configured to detect a component of the weight of the payload 108 exerted towards a forward portion of the left side 228 disposed at the front end 220, while the second primary sensor 316" is configured to detect a component of the weight of the payload 108 exerted towards a forward portion of the right side 232 disposed at the front end 220.

The secondary sensor pair 320 is arranged rearwardly to the primary sensor pair 316. For example, the secondary sensor pair 320 includes a first secondary sensor 320' and a second secondary sensor 320". The first secondary sensor 320' may be coupled to the first arm 176, while the second secondary sensor 320" may be coupled to the second arm 180. Both the first secondary sensor 320' and the second secondary sensor 320" may be arranged and coupled to corresponding portions of the first arm 176 and the second arm 180 where there is potential for the dump body 104 to touch or come into contact with the rearward sub-frame portion 148 of the frame 124. In general, the first secondary sensor 320' and the second secondary sensor 320" may be disposed along the width, W, of the dump body 104 and may assume a position that is generally intermediate to the length, L, of the dump body 104 (see FIG. 3). In so doing, the first secondary sensor 320' is configured to detect a component of the weight of the payload 108 exerted at an intermediate portion of the dump body 104 disposed towards the left side 228, while the second secondary sensor 320" is configured to detect a component of the weight of the payload 108 exerted at an intermediate portion of the dump body 104 disposed towards the right side 232.

In some embodiments, each of the primary sensor pair 316 and the secondary sensor pair 320 may include a load cell 324 having a metallic pad 328 (see FIG. 1) deformable under the weight of the payload 108 to exhibit a corresponding change in an inherent resistance (of the metallic pad 328). To this end, such a metallic pad 328 may be incorporated into a Wheatstone bridge circuit (not shown) which facilitates indication of the metallic pad's deformation based on the corresponding change in the inherent resistance.

Further, the second sensors 308 may relate to a pair of second sensors 308 configured to detect components of the weight of the payload 108 exerted through the dump body 104 towards a rearward portion of the dump body 104 near the rear end 224. The pair of second sensors 308 may be adapted to be arranged correspondingly within the first pin 264 and the second pin 268, and may be configured to correspondingly detect a component of the weight of the payload 108 exerted through the dump body 104.

Figure 5:
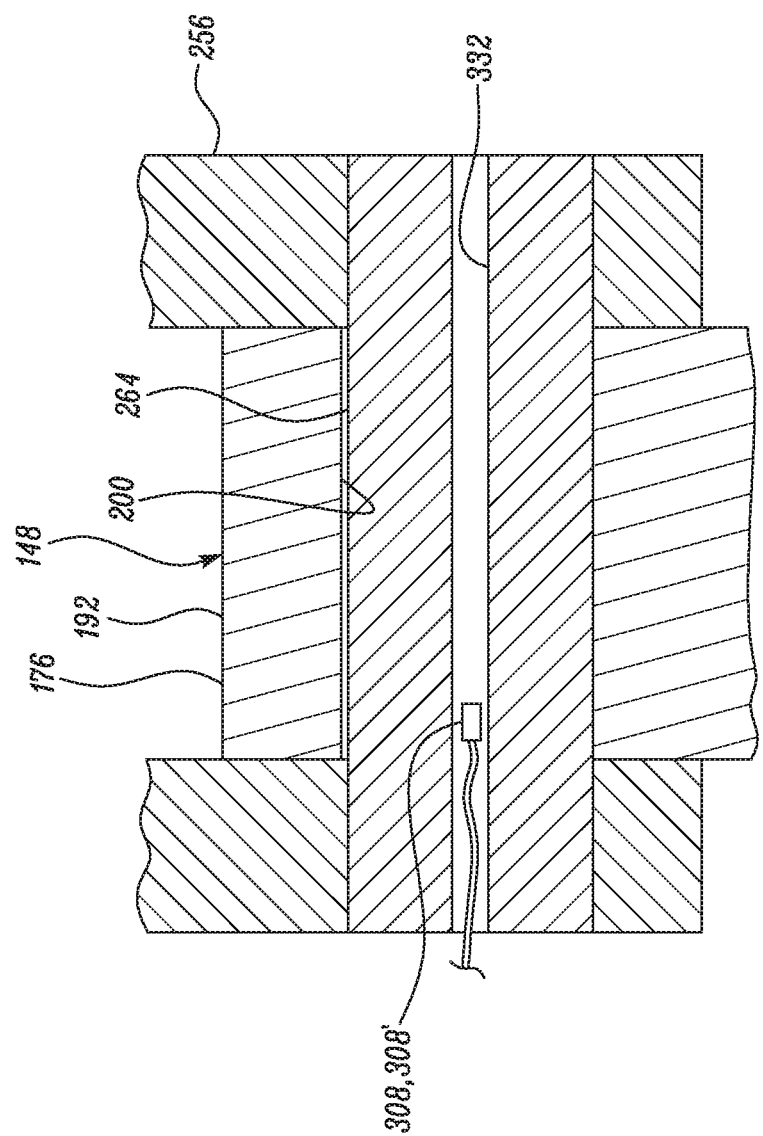
FIG. 5 illustrates a coupling between the rearward sub-frame portion and the dump body and a positioning of a sensor of a system that is applied for detecting distribution of a weight of a payload in the dump body, in accordance with an embodiment of the present disclosure.

In further detail, the pair of second sensors 308 may correspond to a primary second sensor 308' and a secondary second sensor 308". The primary second sensor 308' may be housed within the first pin 264 (see FIG. 5), and may be configured to detect a component of the weight of the payload exerted towards a rearward portion of the left side 228 disposed at the rear end 224. The secondary second sensor 308" may be housed within the second pin 268, and may be configured to detect a component of the weight of the payload 108 exerted towards a rearward portion of the right side 232 disposed at the rear end 224. Such housing of the second sensors 308 is possible by having each of the first pin 264 and the second pin 268 define corresponding slots that extend throughout the corresponding lengths of the first pin 264 and the second pin 268. As an example, a slot 332 defined through the first pin 264 is depicted in FIG. 5, and the corresponding, primary second sensor 308' housed therein, is also exemplarily depicted. Like the first sensors 304, in some embodiments, the second sensors 308 may also include a load cell based sensor configuration.

According to an exemplary sensor layout, and with respect to the dump body 104 being seated on the rearward sub-frame portion 148 of the frame 124, the first primary sensor 316' may be arranged towards a forward portion of the left side 228 disposed at the front end 220 of the dump body 104, the second primary sensor 316" may be arranged towards a forward portion of the right side 232 disposed at the front end 220 of the dump body 104, the first secondary sensor 320' may be arranged towards the left side 228 at an intermediate portion of the dump body 104, the second secondary sensor 320" may be arranged towards the right side 232 at an intermediate portion of the dump body 104, the primary second sensor 308' may be arranged towards a rearward portion of the left side 228 disposed at the rear end 224 of the dump body 104, and the secondary second sensor 308" may be arranged towards a rearward portion of the right side 232 disposed at the rear end 224 of the dump body 104.

Effectively, the first primary sensor 316', the first secondary sensor 320', and the primary second sensor 308', may be disposed towards the left side 228 under the dump body 104 (collectively, left side sensors 316', 320', 308'), while the second primary sensor 316", the second secondary sensor 320", and the secondary second sensor 308", may be disposed towards the right side 232 under the dump body 104 (collectively, right side sensors 316", 320", 308"). The first sensors 304 and the second sensors 308 make a total of six sensors, as disclosed. However, additional or lesser number of sensors, may be contemplated.

It will be appreciated that both the first sensors 304 and the second sensors 308 may be appropriately calibrated such that no component of the weight of the dump body 104 may be passed and/or exerted to any of the first sensors 304 and/or to the second sensors 308, at any given point. Also, this may mean that, in an unladen state of the dump body 104 of the machine 112, the first sensors 304 and the second sensors 308 may detect negligible or zero weight, or negligible or zero components of any weight.

The controller 312 may be communicably coupled to the first sensors 304 and the second sensors 308 (e.g., by way of corresponding transceivers 336) (see FIG. 6), and may be configured to receive data related to the components of the weight of the payload 108 detected by the first sensors 304 and the second sensors 308. The controller 312 may also be communicably coupled to the operator interface 160. The controller 312 may be configured to retrieve a set of instructions from a memory 340 and run the set of instructions based on the receipt of data from the first sensors 304 and the second sensors 308. For example, the controller 312 may be configured to determine a status of payload distribution in the dump body 104 based on the components of the weight of the payload 108 detected by the first sensors 304 and the second sensors 308, and generate a notification to indicate the status of payload distribution.

With continued reference to FIGS. 3, 4, and 6, the controller 312 may be able to generate or retrieve a generic machine model (referred to as a model 344, hereinafter) and configure the model 344 such that one or more of the views—e.g., a side view of the machine 112 (FIG. 3), a rear view of the machine 112 (FIG. 4), and a plan view of the machine 112 or of the dump body 104 (FIG. 6), may be generated on the operator interface 160. According to one example, the controller 312 may reproduce the plan view of the dump body 104 on the operator interface 160 and may be configured to determine or retrieve positions occupied by the first sensors 304 and the second sensors 308, according to the plan view (see layout of the sensors 304, 308 provided in FIG. 6). In some embodiments, it is possible that the positions assumed by each of the first sensors 304 and each of the second sensors 308 is predetermined and stored as a 'position data' within the memory 340, and the controller 312 may retrieve such a 'position data' as and when required—e.g., when a command is issued to detect a payload distribution in the dump body 104 by a user or an operator.

Given that the first sensors 304 and the second sensors 308 make a total of six sensors, six corresponding positions with respect to the dump body 104 may be determined or retrieved by the controller 312. Further, corresponding to the six positions of the sensors 304, 308, six corresponding zones may also be determined—e.g., a first zone 350, a second zone 352, a third zone 354, a fourth zone 356, a fifth zone 358, and a sixth zone 360 (see FIG. 6). As one example, once the positions of the first sensors 304 and the second sensors 308 are determined or retrieved by the controller 312, the controller 312 may define said zones corresponding to the first sensors 304 and the second sensors 308 according to predefined measurement parameter. For example, the controller 312 may determine the corresponding zones 350, 352, 354, 356, 358, 360 according to a fixed radius defined around the corresponding sensor positions. Optionally, the zones 350, 352, 354, 356, 358, 360 may be predetermined as well, and may be simply fetched by the controller 312, when needed. Such zones 350, 352, 354, 356, 358, 360 may be reproduced and may be visualized on the plan view of the model 344 (see FIG. 6) of the dump body 104 of the machine 112, as generated on the operator interface 160.

To determine the status of payload distribution based on the components of the weight of the payload 108 detected correspondingly by the first sensors 304 and the second sensors 308, the controller 312 may be configured to select at least one component having a highest weight component value among all components of the weight detected by the first sensors 304 and the second sensors 308. Thereafter, the controller 312 is configured to identify at least one sensor from the set of first sensors 304 and the second sensors 308 that detects the highest weight component value. Further, the controller 312 is configured to determine a corresponding zone (as discussed above) corresponding to such a sensor on the dump body 104 (e.g., on the model of the dump body 104) and designate that zone as an area in which a center of gravity of the payload 108 is located. For example, the controller 312 may designate the second zone 352 as the area in which the center of gravity of the payload 108 is located. In yet another example, the controller 312 may demarcate the second zone 352 with a specific color so as to help an operator/user, accessing or viewing the operator interface 160, identify the second zone 352 as the area in which the center of gravity of the payload 108 is located.

In some embodiments, the controller 312 may generate the notification to indicate the status of payload distribution by demarcating and designating all zones 350, 352, 354, 356, 358, 360 on the model 344 of the dump body 104 (i.e., on the plan view of the model 344 of the dump body 104) with a sequential color gradient scheme such that a zone having the highest weight component value among all components is allocated with a unique color that scatters the least, and a zone corresponding to one or more components having a lowest weight component value among all components is allocated with a color that scatters the most. An exemplary detailed discussion related to such working of the system 300 is set out later in the disclosure.

The controller 312 may be connected to the machine's (i.e., the machine 112) electronic control module (ECM) (not shown), such as a safety module or a dynamics module, or may be configured as a stand-alone entity. Optionally, the controller 312 may be integral and be one and the same as an ECM of the machine 112. More particularly, the controller 312 may be a microprocessor-based device, and/or may be envisioned as an application-specific integrated circuit, or other logic devices, which provide controller functionality, and such devices being known to those with ordinary skill in the art. In one example, it is possible for the controller 312 to include or be representative of one or more controllers having separate or integrally configured processing units to process a variety of data (or input) received from the sensors. Further, the controller 312 may be optimally suited for accommodation within certain machine panels or portions from where the controller 312 may remain accessible for ease of use, service, calibration, and repairs. Optionally, the controller 312 may also be deployed at a remote site either in proximity to the operator interface 160 or away from the operator interface 160, and, in some cases, the controller 312 may be hard-wired to the operator interface 160 and to the first sensors 304 and second sensors 308, and to various other components and devices of the machine 100.

Processing units, to convert and/or process the signals from the sensors 304, 308 (within the controller 312) may include, but are not limited to, an X86 processor, a Reduced Instruction Set Computing (RISC) processor, an Application Specific Integrated Circuit (ASIC) processor, a Complex Instruction Set Computing (CISC) processor, an Advanced RISC Machine (ARM) processor, or any other processor.

Examples of the memory 340 may include a hard disk drive (HDD), and a secure digital (SD) card. Further, the memory 340 may include non-volatile/volatile memory units such as a random-access memory (RAM)/a read only memory (ROM), which include associated input and output buses. The memory 340 may be configured to store the set of instruction that may be executable by the controller 312 to execute a method for detecting distribution of a weight of a payload in a dump body of a vehicle, as has been discussed above.

INDUSTRIAL APPLICABILITY

During operation, an operator of the machine 112 may traverse repeatedly between a load location and a dump location of the worksite 116. The method for detecting the distribution of a weight of the payload 108 in the dump body 104 of the machine 112 may be executed or performed, exemplarily, at instances when the dump body 104 of the machine 112 is being loaded and/or at instances when the machine 112 is travelling, with the dump body 104 being loaded at least in part or in full.

During a loading event, for example, the controller 312 may receive an instruction (by way of a command, signal, etc.) (e.g., from the operator interface 160) to bespeak an initiation of the method. In response to the instruction, and as noted above, the controller 312 receives data (i.e., that corresponds to components of the weight of the payload 108) from each of the first sensors 304 and the second sensors 308. Having received data from each of the first sensors 304 and the second sensors 308 (i.e., all six sensors), the controller 312 may select the component that has the highest weight component value among all components of the weight of the payload 108, and may accordingly identify a sensor (i.e., one sensor from the first sensors 304 and the second sensors 308) that detects said component with the highest weight component value.

According to an example, it will be considered exemplarily that a bulk of the payload 108 sits towards the front end 220 and towards the right side 232 of the dump body 104, and that said bulk of the payload 108 exerts the highest component of the weight of the payload 108 among all components of the weight of the payload 108 detected by the sensors 304, 308. Since the second primary sensor 316" is arranged under the dump body 104 towards a forward portion of the right side 232 disposed at the front end 220 of the dump body 104, said component of the weight associated with the bulk of the payload 108 may be detected by the second primary sensor 316". The controller 312, upon receipt of said component from the second primary sensor 316", may tally said component with components detected by all the remaining sensors 304, 306 and determines said component to be holding the highest weight component value. Next, knowing that said highest weight component value is detected by the second primary sensor 316", the controller 312 may determine a zone (e.g., the second zone 352) corresponding to the second primary sensor 316" on the model 344 of the dump body 104 as an area in which a center of gravity of the payload 108 is located.

As part of notifying the status of payload distribution in the dump body 104 of the machine 112, the controller 312 may demarcate multiple zones (i.e., the zones 350, 352, 354, 356, 358, 360) corresponding to the first sensors 304 and the second sensors 308 on the model 344 (i.e., one zone per sensor). Thereafter, the controller 312 may designate all the zones 350, 352, 354, 356, 358, 360 with a sequential color gradient scheme such that the second zone 352 (i.e., corresponding to the second primary sensor 316" that detected the highest weight component value) may be allocated with a unique color that scatters the least. For example, the second zone 352 corresponding to the second primary sensor 316" may be allocated and marked with red color. Further, a zone corresponding to a component having a lowest weight component value among all components may be allocated with a color that scatters the most. For example, if the primary second sensor 308' detected the least of the components of the weight of the payload 108, the fifth zone 358 corresponding to the primary second sensor 308' may be allocated and marked with either violet or blue color.

In some embodiments, the controller 312 may be configured to determine the status of payload distribution in the dump body 104 by determining a center of gravity of the payload 108 or by determining a shift in the center of gravity of the payload 108 from an ideal location of the center of gravity of the payload 108. For ease, said center of gravity, as determined by the controller 312 may be referred to as an 'actual center of gravity', hereinafter. To determine the actual center of gravity, the controller 312 may define a co-ordinate system 380 (see FIGS. 3 and 4) with respect to the dump body 104. The co-ordinate system 380 may define an X-axis along the length, L, of the dump body 104 (see FIG. 3), a Y-axis along a height, H, of the dump body 104, and a Z-axis along the width, W, of the dump body 104.

It may be noted that the controller 312 defines the co-ordinate system 380 such that the first primary sensor 316' and the first secondary sensor 320' may be disposed along the X-axis, the common axis 272 passing through the pair of second sensors 308 is defined in a Y-Z plane defined by the Y-axis and the Z-axis of the co-ordinate system 380. To determine the actual center of gravity, the controller 312 may be configured to compute an X co-ordinate and a Z co-ordinate on an X-Z plane defined by the X-axis and the Z-axis of the co-ordinate system 380. As an example, the depiction of the plan view of the dump body 104, as provided or generated on the operator interface 160 (see FIG. 6), may be contemplated to be in the X-Z plane. Exemplary discussions related to the computation of the X co-ordinate and the Z co-ordinate on the X-Z plane will now follow.

To compute the X co-ordinate of the center of gravity on the X-Z plane, the controller 312 may summate components of the weight of the payload 108 detected by the second sensors 308 to arrive at a first summation value. Thereafter, the controller 312 may summate components of the weight of the payload 108 detected by the first sensors 304 and the second sensors 308, to arrive at an overall weight of the payload 108. Further, the controller 312 may determine a first weighing factor by dividing the first summation value by the overall weight, and, subsequently, the controller 312 may compute the X co-ordinate by deriving a product of the first weighing factor and a displacement (e.g., an overall displacement or average displacement) ($D_X$) defined between the first sensors 304 and the second sensors 308, along the X-axis.

In some embodiments, if the machine 112 were on a slope, e.g., in a manner in which the forward end 164 is raised relative to the rearward end 168, an angle (θ) between the rearward longitudinal axis 184 and the horizontal may be defined. In such a case, the X co-ordinate of the center of gravity on the X-Z plane may change. For example, to compute the change in the X co-ordinate (i.e., δX), the following equation may be applied by the controller 312:

$$\delta X = D_X - L_\theta, \text{ where}$$

$$L_\theta = D_X \cdot \cos\theta$$

Said value of δX may be suitably added to the X co-ordinate, as may be computed according to the exemplary discussions noted above, to determine an effective X co-ordinate resulting from the machine's position on the slope.

To compute the Z co-ordinate of the center of gravity on the X-Z plane, the controller 312 may summate the component of the weight of the payload 108 detected by the secondary second sensor 308" with a sum of the components of the weight of the payload 108 detected by the second primary sensor 316" and the second secondary sensor 320" to arrive at a second summation value. Thereafter, the controller 312 may summate components of the weight of the payload 108 detected by the first sensors 304 and the second sensors 308, to arrive at an overall weight of the payload 108. Further, the controller 312 may determine a second weighing factor by dividing the second summation value by the overall weight, and, subsequently, the controller 312 may compute the Z co-ordinate by deriving a product of the second weighing factor and a displacement ($D_Z$) defined between the sensors 316', 320', 308' disposed towards the left side and the sensors 316", 320", 308" disposed towards the right side (i.e., a displacement, $D_Z$, defined between the left side sensors 316', 320', 308' and the right side sensors 316", 320", 308"), along the Z-axis.

In some embodiments, if the machine 112 were on a slope with one side (e.g., the right side 232) raised higher than the other side (e.g., the left side 228), an angle (φ) between the common axis 272 and the horizontal may be defined, and the Z co-ordinate on the X-Z plane may change. In such a case, a similar discussion, as noted for the change in the X co-ordinate (i.e., δX), may be contemplated and applied for computing the change in the Z co-ordinate (i.e., δZ). For example, to compute the change in the Z co-ordinate (i.e., δZ), the following equation may be applied by the controller 312:

$$\delta Z = D_Z - W_\varphi, \text{ where}$$

$$W_\varphi = D_Z \cdot \cos\varphi$$

Said value of δZ may be suitably added to the Z co-ordinate, as may be computed according to the exemplary discussions noted above, to determine an effective Z co-ordinate resulting from the machine's position on the slope.

According to one embodiment, the controller 312 is configured to compare a location of the actual center of gravity, as determined by way of computing the X co-ordinate and the Z co-ordinate, to an ideal location of the center of gravity of the payload 108 (i.e., an ideal X co-ordinate and an ideal Z co-ordinate), and may output (e.g., on the operator interface 160) the variation between the location of the actual center of gravity and the ideal location of the center of gravity. Exemplarily, such an ideal location of the center of gravity may be prestored within the memory 340. According to some embodiments, the controller 312 may issue an alert if the location of the actual center of gravity is outside a predetermined region defined around the ideal location of the center of gravity.

In some embodiments, the controller 312 may detect an angle (e.g., a slope angle) of the machine 112 with respect to the horizontal and may determine a position of the actual center of gravity of the dump body 104 (or an offset between the actual center of gravity and the ideal center of gravity). Further, the controller 312 may determine a maximum slope angle up to which the machine 112 may be tilted to the horizontal based on the position of the actual center of gravity or based on the offset so as safely operate without rollover (e.g., on a slope or an incline). For example, larger the offset, lesser may be the maximum angle determined by the controller 312. In some embodiments, components of the offset may be determined in the X-direction (i.e., along the X-axis) and in the Z-direction (i.e., along the Z-axis). The component of the offset in the X-direction may help determine a maximum angle the machine 112 may acquire while traversing uphill and/or downhill, and, similarly, the component of the offset in the Z-direction may help determine a maximum angle the machine 112 may acquire while traversing a slope titled towards the left side 228 and/or a slope tilted towards the right side 232. In any instance, if the machine 112 acquires a slope angle (e.g., either sideways or in the rearward-to-forward direction) that exceeds such a maximum slope angle, the controller 312 may issue an alert, and may generate the alert on the operator interface 160.

By way of the system 300 and the corresponding method, an operator of the machine 112 is apprised of the manner in which the payload 108 sits in the cavity 252 of the dump body 104. At the time of the loading the payload 108, for example, if the loading causes one side (e.g., the left side 228) to be weighed down or saddled more than the other side (e.g., the right side 232) by the incoming payload 108, the operator may pass on instructions to a loading machine (or to an operator of the loading machine) to suitably move and manipulate the loading action from a cavity site where there is a higher payload concentration to one or more other cavity sites where there is a lower payload concentration.

Similarly, at the time of machine movement, the operator may access the operator interface 160 and gauge the manner of seating of the payload 108 in the cavity 252. If it is determined that the payload 108 is sitting more towards the left side 228 than to the right side 232, for example, the operator may be able to control the machine's maneuvers more judiciously, enabling the machine 112 to move more stably over slopes, hills, and undulations of the worksite 116. In brevity, by way of the system 300, it becomes fairly easy to determine if the payload 108 is sitting towards any of the sides 228, 232 or towards the ends 220, 224, at any given point. Additionally, the system 300 may be used in conjunction with slope sensors so as to control the machine's speed while navigating through various areas of the worksite 116.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

The invention claimed is:

1. A system for detecting distribution of a weight of a payload in a dump body of a vehicle, the dump body being pivotable about a plurality of co-axially aligned pins to be selectively seated and titled relative to a frame of the vehicle, the system comprising:
a plurality of first sensors adapted to be arranged between the dump body and the frame, each first sensor of the plurality of first sensors configured to detect a component of the weight of the payload exerted through the dump body when the dump body is seated relative to the frame;
a plurality of second sensors adapted to be arranged correspondingly within the plurality of co-axially aligned pins, each second sensor of the plurality of second sensors configured to detect a component of the weight of the payload exerted through the dump body; and
a controller configured to:
determine a status of payload distribution in the dump body based on the component of the weight of the payload detected by each first sensor and each second sensor,
generate a notification to indicate the status of payload distribution,
wherein to determine the status of payload distribution based on components of the weight of the payload detected correspondingly by the plurality of first sensors and the plurality of second sensors, the controller is further configured to:
select at least one component having a highest weight component value among all components of the weight detected by the plurality of first sensors and the plurality of second sensors;
identify at least one sensor from the plurality of first sensors and the plurality of second sensors that detects the at least one component; and
determine a zone corresponding to the at least one sensor on a model of the dump body as an area in which a center of gravity of the payload is located.

2. The system of claim 1, wherein each first sensor includes a load cell having at least one metallic pad deformable under the weight of the payload to exhibit a corresponding change in an inherent resistance.

3. The system of claim 1, wherein
the dump body includes a front end, a rear end, and laterally opposed sides extending between the front end and the rear end, the laterally opposed sides being defined as a left side and a right side of the dump body, and the plurality of first sensors includes a primary sensor pair arranged in proximity of the front end of the dump body, wherein
a first primary sensor of the primary sensor pair is configured to detect a component of the weight of the payload exerted towards a forward portion of the left side disposed at the front end, and a second primary sensor of the primary sensor pair is configured to detect a component of the weight of the payload exerted towards a forward portion of the right side disposed at the front end.

4. The system of claim 3, wherein the plurality of first sensors includes a secondary sensor pair arranged rearwardly to the primary sensor pair, wherein
a first secondary sensor of the secondary sensor pair is configured to detect a component of the weight of the payload exerted towards an intermediate portion of the left side, and
a second secondary sensor of the secondary sensor pair is configured to detect a component of the weight of the payload exerted towards an intermediate portion of the right side.

5. The system of claim 4, wherein
the plurality of co-axially aligned pins corresponds to a pair of co-axially aligned pins and the plurality of second sensors includes a pair of second sensors configured to detect components of the weight of the payload exerted towards a rearward portion of the dump body near the rear end, wherein
one second sensor of the pair of second sensors is housed within one pin of the pair of co-axially aligned pins, and is configured to detect a component of the weight of the payload exerted towards a rearward portion of the left side disposed at the rear end, and
the other second sensor of the pair of second sensors is housed within the other pin of the pair of co-axially aligned pins, and is configured to detect a component of the weight of the payload exerted towards a rearward portion of the right side disposed at the rear end.

6. The system of claim 5, wherein the controller is configured to: define a co-ordinate system with respect to the dump body, the co-ordinate system defining an X-axis along a length of the dump body, a Y-axis along a height of the dump body, and a Z-axis along a width of the dump body, wherein
the first primary sensor and the first secondary sensor are disposed along the X-axis, the pair of second sensors are disposed along an axis defined in a Y-Z plane defined by the Y-axis and the Z-axis of the co-ordinate system, and
to determine the status of payload distribution in the dump body, the controller is configured to determine the center of gravity of the payload by way of computing an X co-ordinate and a Z co-ordinate on an X-Z plane defined by the X-axis and the Z-axis of the co-ordinate system.

7. The system of claim 6, wherein the controller is configured to:
compare a location of the center of gravity to an ideal location of the center of gravity; and
issue an alert if the location of the center of gravity is outside a predetermined region defined around the ideal location of the center of gravity.

8. The system of claim 6, wherein the controller is configured to:
detect a slope angle of the vehicle with respect to a horizontal;
determine a maximum slope angle based on a position of the center of gravity; and issue an alert if the slope angle exceeds the maximum slope angle.

9. The system of claim 1, wherein to generate the notification, the controller is configured to:
- demarcate a plurality of zones corresponding to the plurality of first sensors and the plurality of second sensors on the model of the dump body; and
- designate the plurality of zones with a sequential color gradient scheme such that the zone corresponding to the at least one component having the highest weight component value among all components is allocated with a unique color that scatters the least, and
- a zone corresponding to one or more components having a lowest weight component value among all components is allocated with a color that scatters the most.

10. A machine comprising:
- a frame;
- a dump body being pivotable about a plurality of co-axially aligned pins to be selectively seated and titled relative to the frame, the dump body adapted to receive a payload; and
- a system for detecting distribution of a weight of the payload according to claim 1.

11. A method for detecting distribution of a weight of a payload in a dump body of a vehicle, the dump body being pivotable about a plurality of co-axially aligned pins to be selectively seated and titled relative to a frame of the vehicle, the method comprising:
- detecting, by a plurality of first sensors, components of the weight of the payload exerted through the dump body correspondingly when the dump body is seated relative to the frame, the plurality of first sensors being arranged between the dump body and the frame;
- detecting, by a plurality of second sensors, components of the weight of the payload exerted through the dump body correspondingly, the plurality of second sensors being arranged correspondingly within the plurality of co-axially aligned pins;
- determining, by a controller, a status of payload distribution in the dump body based on components of the weight of the payload detected correspondingly by the plurality of first sensors and the plurality of second sensors, wherein determining the status of payload distribution based on components of the weight of the payload detected correspondingly by the plurality of first sensors and the plurality of second sensors includes:
  - selecting, by the controller, at least one component having a highest weight component value among all components of the weight detected by the plurality of first sensors and the plurality of second sensors;
  - identifying, by the controller, at least one sensor from the plurality of first sensors and the plurality of second sensors that detects the at least one component; and
  - determining, by the controller, a zone corresponding to the at least one sensor on a model of the dump body as an area in which a center of gravity of the payload is located; and
- generating, by the controller, a notification to indicate the status of payload distribution.

12. The method of claim 11, wherein generating the notification to indicate the status of payload distribution includes:
- demarcating, by the controller, a plurality of zones corresponding to the plurality of first sensors and the plurality of second sensors on the model of the dump body; and designating, by the controller, the plurality of zones with a sequential color gradient scheme such that a zone corresponding to the at least one component having the highest weight component value among all components is allocated with a unique color that scatters the least, and
- a zone corresponding to one or more components having a lowest weight component value among all components is allocated with a color that scatters the most.

13. The method of claim 11, wherein the dump body includes a front end, a rear end, and laterally opposed sides extending between the front end and the rear end, the laterally opposed sides being defined as a left side and a right side of the dump body.

14. The method of claim 13, wherein the plurality of first sensors includes:
- a primary sensor pair with a first primary sensor of the primary sensor pair configured to detect a component of the weight of the payload exerted towards a forward portion of the left side disposed at the front end, and a second primary sensor of the primary sensor pair configured to detect a component of the weight of the payload exerted towards a forward portion of the right side disposed at the front end; and
- a secondary sensor pair with a first secondary sensor of the secondary sensor pair configured to detect a component of the weight of the payload exerted towards an intermediate portion of the left side, and a second secondary sensor of the secondary sensor pair configured to detect a component of the weight of the payload exerted towards an intermediate portion of the right side.

15. The method of claim 14, wherein the plurality of second sensors includes:
- a pair of second sensors, with one second sensor of the pair of second sensors configured to detect a component of the weight of the payload exerted towards a rearward portion of the left side disposed at the rear end, and the other second sensor of the pair of second sensors configured to detect a component of the weight of the payload exerted towards a rearward portion of the right side disposed at the rear end.

16. The method of claim 15, further including:
- defining, by the controller, a co-ordinate system with respect to the dump body, the co-ordinate system defining an X-axis along a length of the dump body, a Y-axis along a height of the dump body, and a Z-axis along a width of the dump body, wherein
- the first primary sensor and the first secondary sensor are disposed along the X-axis, the pair of second sensors are disposed along an axis defined in a Y-Z plane defined by the Y-axis and the Z-axis of the co-ordinate system, and
- determining the status of payload distribution in the dump body includes determining the center of gravity of the payload by way of computing an X co-ordinate and a Z co-ordinate on an X-Z plane defined by the X-axis and the Z-axis of the co-ordinate system.

17. The method of claim 16 further comprising:
- comparing, by the controller, a location of the center of gravity to an ideal location of the center of gravity; and
- issuing, by the controller, an alert if the location of the center of gravity is outside a predetermined region defined around the ideal location of the center of gravity.

18. The method of claim 16 further comprising:
detecting, by the controller, a slope angle of the vehicle with respect to a horizontal; determining, by the controller, a maximum slope angle based on a position of the center of gravity; and
issuing, by the controller, an alert if the slope angle exceeds the maximum slope angle.

* * * * *